United States Patent [19]
Enders

[11] Patent Number: 6,089,595
[45] Date of Patent: Jul. 18, 2000

[54] SIDE IMPACT AIRBAG MODULE

[75] Inventor: Mark L. Enders, Ogden, Utah

[73] Assignee: Autoliv ASP, Inc., Ogden, Utah

[21] Appl. No.: 08/987,703

[22] Filed: Dec. 9, 1997

[51] Int. Cl.[7] .................................................. B60R 21/22
[52] U.S. Cl. ..................................... 280/730.2; 280/728.2
[58] Field of Search .............................. 280/730.2, 728.2, 280/730.1, 728.1, 728.3

[56] References Cited

U.S. PATENT DOCUMENTS

| | | |
|---|---|---|
| 5,224,732 | 7/1993 | Warner et al. . |
| 5,492,361 | 2/1996 | Kim . |
| 5,503,428 | 4/1996 | Awotwi et al. . |
| 5,533,750 | 7/1996 | Karlow et al. . |
| 5,542,691 | 8/1996 | Marjanski et al. . |
| 5,547,214 | 8/1996 | Zimmerman, II et al. . |
| 5,556,127 | 9/1996 | Hurford et al. ...................... 280/730.2 |
| 5,564,739 | 10/1996 | Davidson . |
| 5,588,667 | 12/1996 | Emambakhsh et al. ............. 280/728.2 |
| 5,588,671 | 12/1996 | Boumarafi et al. . |
| 5,628,527 | 5/1997 | Olson et al. . |
| 5,630,616 | 5/1997 | McPherson . |
| 5,639,111 | 6/1997 | Spencer et al. . |
| 5,645,295 | 7/1997 | White, Jr. et al. . |
| 5,647,608 | 7/1997 | Damman et al. ..................... 280/728.2 |
| 5,681,055 | 10/1997 | Green et al. .......................... 280/728.2 |
| 5,709,402 | 1/1998 | Leonard ............................... 280/728.2 |
| 5,788,272 | 8/1998 | Yanase ................................. 280/730.2 |
| 5,803,485 | 9/1998 | Acker et al. ......................... 280/728.2 |
| 5,845,932 | 12/1998 | Kimura et al. ....................... 280/730.2 |
| 5,876,060 | 3/1999 | Davidson et al. ................... 280/730.2 |
| 5,882,033 | 3/1999 | Lachat ................................. 280/728.3 |
| 5,890,733 | 4/1999 | Dillon ................................. 280/730.2 |
| 5,899,490 | 5/1999 | Wipasuramonton et al. ....... 280/730.2 |

*Primary Examiner*—Lanna Mai
*Assistant Examiner*—Lynda Jasmin

[57] ABSTRACT

A side impact airbag deployment system which consists of a vehicle seat having a seat bottom portion and a seat back portion, and a rigid seat frame member internally disposed within the seat back portion. An airbag module is secured to the rigid seat frame member and oriented for deployment of the airbag through the seat back portion, the module including an airbag and inflator assembly, and a cover member for containing the airbag and inflator assembly and for providing a defined pathway for deployment of said airbag when inflated. Further included is an opening on the seat back portion forming part of the defined pathway, as well as a mounting bracket, including an arrangement for mounting of the airbag and inflator assembly, and an arrangement for fastening the bracket to the rigid seat frame member. Another feature is that a portion of the cover member overlies the defined pathway and fits into the opening in the seat back portion so as to serve as a door and to provide an external decorative cover.

12 Claims, 3 Drawing Sheets

SIDE IMPACT AIRBAG MODULE

FIELD OF THE INVENTION

This invention relates to a side impact airbag module and to a system for deploying the module from its containment within a vehicle seat to the outside. More particularly, the invention relates to the design of the container or cover member in which the air bag is contained until an emergency arises, whereupon the airbag is then deployed for protection of a car occupant.

BACKGROUND OF THE INVENTION

Airbag modules have been employed in a variety of ways in motor vehicles to protect vehicle occupants in the event of rapid deceleration or collision. It has come to be recognized that in addition to the modules conventionally disposed within the steering wheel or behind the passenger instrument panel, it is important to employ side airbags mounted in close proximity to the vehicle occupant, as, for example, in vehicle doors or passenger seats. One location for the side airbag that has come to be favored is to be mounted on an internal frame of a vehicle seat.

One problem that has occurred in the construction of an airbag system is that deployment is usually accomplished through a frangible seam in the seat between the front and side panels of the seat back. In such case, that is, where the side impact airbag module is mounted some distance from the finish surface of the seat, deployment consistency and location become difficult. Accordingly, to accomplish the effective use of such side impact airbags so as adequately to protect the vehicle occupants, it is extremely important for the airbag deployment to be consistent at a predetermined location on the seat surface.

It is therefore a primary object of the present invention to provide an extremely simplified arrangement by which an airbag module is contained prior to its deployment.

Another primary object is to produce consistent airbag deployment at a precise location.

Another object is to provide that the container or cover member by its strong construction insures that the airbag is deployed in a well-defined pathway to its destination.

A further object is to provide that at its destination the airbag encounters an integral portion of the cover member which serves as a door to open responsive to the movement of the airbag against it.

SUMMARY OF THE INVENTION

Briefly stated a primary feature of the invention resides in the unique relationship between an integrated cover member and a mounting bracket for the airbag and inflator assembly whereby the assembly can be readily inserted into the cover member so as to eliminate the need for elaborate cover retaining devices such as locking grooves, retainers, clips and the like which are commonly found in the prior art. Additionally, the cover member is so formed that a riser portion includes a decorative design, such riser portion being integral with the remaining portion of the cover, that is, the non-door portion. Such portion stays intact due to the hoop strength of that portion. The non-door portion of the cover is fastened to the mounting bracket and the non-door portion is clamped between the bracket and the rigid frame seat column.

The invention may thus be defined as follows: a side impact airbag deployment system comprising a vehicle seat having a seat bottom portion and a seat back portion, and a rigid seat frame member internally disposed within the seat back portion; an airbag module secured to the rigid seat frame member and oriented for deployment of the airbag through the seat back portion; the airbag module further comprising an airbag and inflator assembly; a cover member for containing the airbag and inflator assembly and for providing a defined pathway for deployment of said airbag when inflated; an opening on the seat back portion forming part of the defined pathway; a mounting bracket including means for mounting of the airbag and inflator assembly, and means for fastening the bracket to the rigid seat frame number; and a portion of the cover member overlying the defined pathway for fitting into an opening in the seat back portion of a vehicle seat to serve as a door and to provide a decorative riser.

It should be especially noted that the present invention represents an improvement over prior art decorative cover designs for airbag modules in that the part count for the module has been reduced, thereby reducing the cost for the module. The ability of the cover or cover member to retain its integrity is superior in performance to similar devices known in the prior art; and this ability is based on the hoop strength of the cover member, thus avoiding reliance on clamping and holding devices as previously used in the art. It will be understood that this ability is a direct function of the material's tensile strength. Accordingly, strong materials, such as, as thermoplastic elastomeric resins, are preferably employed. The strength of such materials insure that there will not be failure due to large tensile loading in the front and rear walls of the cover member. Furthermore, because the cover member encapsulates the mounting bracket along its entire length, both on the front and back of the bracket, the loading is distributed along a larger surface area of the cover member, as opposed to multiple short lengths and/or numerous point loading designs already known.

BRIEF DESCRIPTION OF THE DRAWINGS

The invention, together with further objects, features, advantages and aspects thereof, will be more clearly understood from the following description taken in connection with the accompanying drawings.

DESCRIPTION OF THE PREFERRED EMBODIMENT

Figure 3:
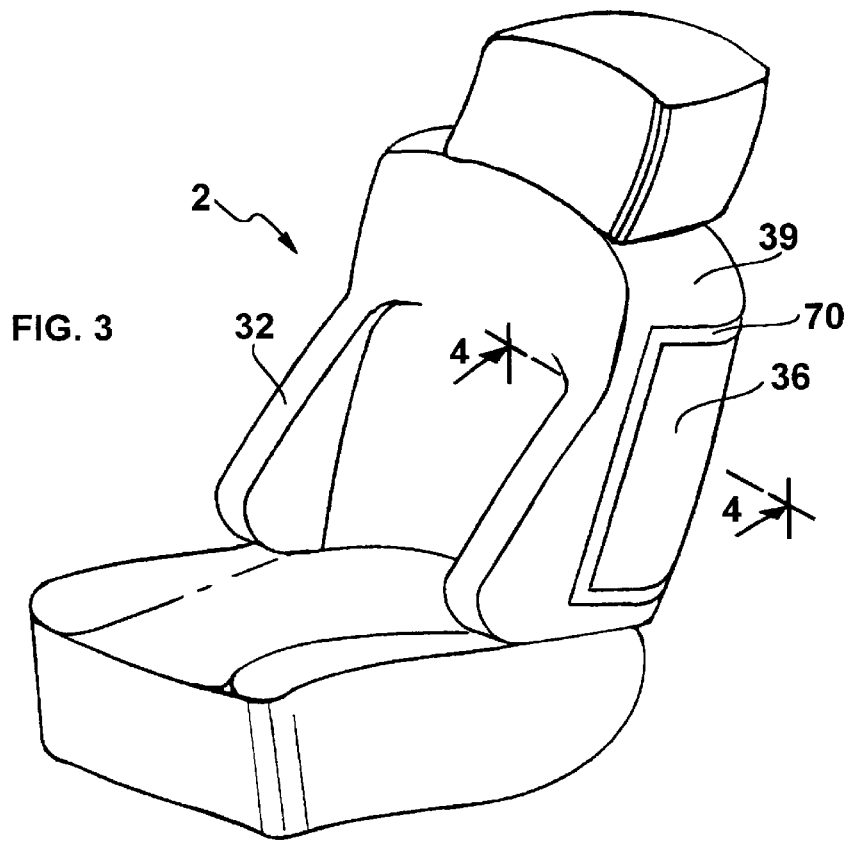
FIG. 3 is a side perspective view of a vehicle seat incorporating the airbag module of the present invention.

In accordance with the preferred embodiment, a very consistent and reliable deployment of a side airbag module 1 mounted internally within a vehicle seat 2 (FIG. 3) is achieved by reason of several features of the invention. One of these resides in the unique relationship in the module, between an integrated cover member 10 and a mounting bracket 12 (FIG. 1) whereby the assembly 14 of an airbag 15 and inflator 16 can be readily inserted into the cover member so that securement of the cover member is easily accomplished. The desired result is realized in the following way: airbag and inflator assembly 14 is mounted on the mounting bracket 12 by means of threaded studs 17 which are run through holes 18 in a side plate 20 forming part of the mounting bracket, the side plate being integrally connected with a main plate 22. The main plate 22 has holes 24 at respectively opposite ends which serve to receive bolts 29 engageable by suitable nuts, thereby enabling attachment of cover number 10 to the frame member 30 (FIG. 4) of the seat back 32 (FIG. 3).

Figure 1:
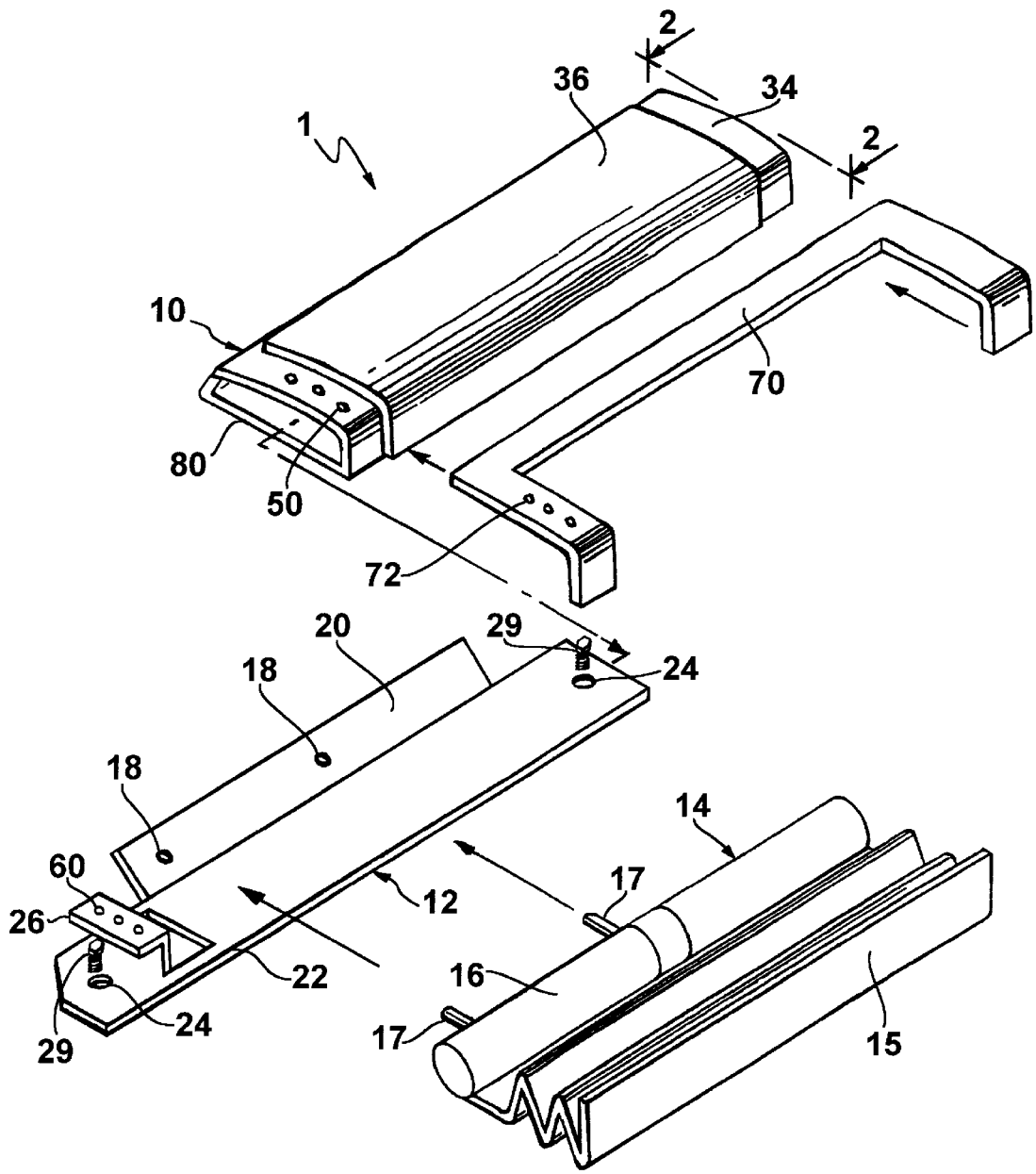
FIG. 1 is an exploded view of the airbag module in accordance with one embodiment of the present invention and showing the several components of the module.
Figure 2:
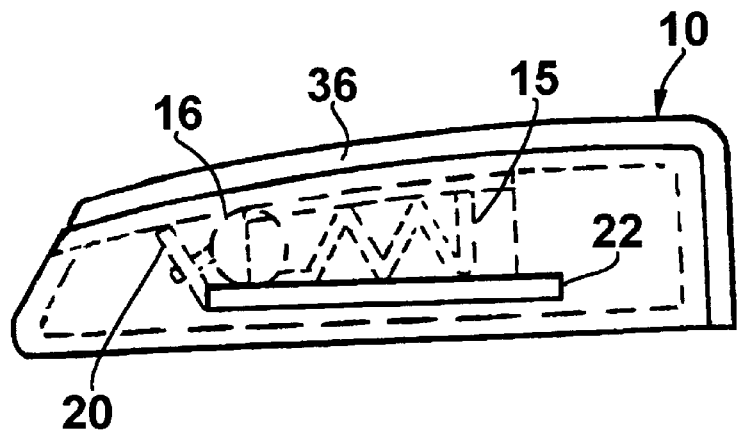
FIG. 2 is an end view of the cover member of the airbag module taken on the line 2—2.
Figure 5:
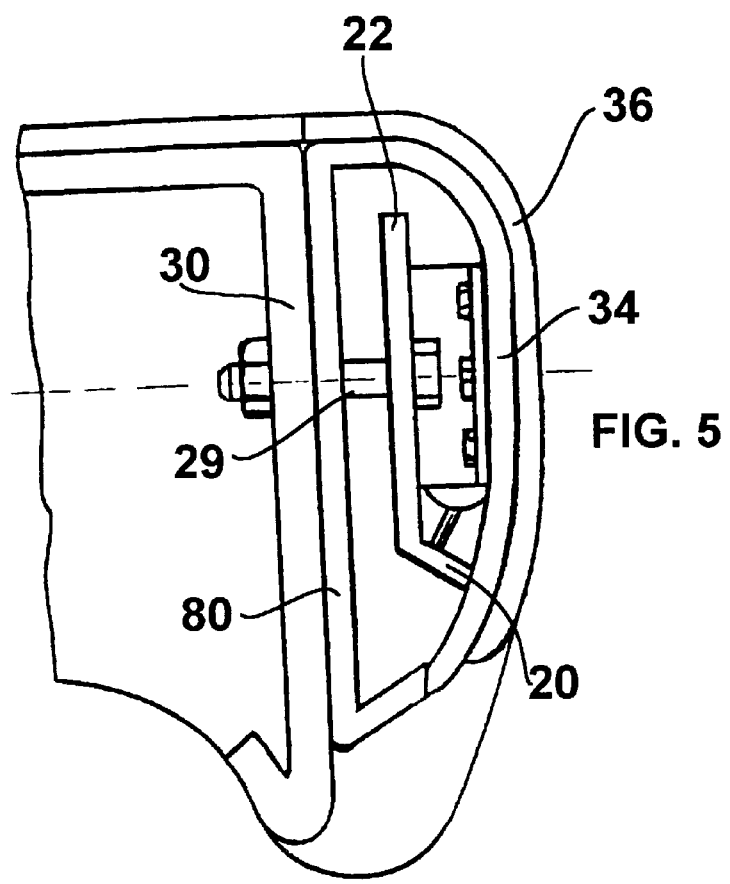
FIG. 5 is a partial cross-sectional end view taken along line 5—5 of FIG. 3 showing the airbag module affixed to the rigid frame member of the seat back.
Figure 4:
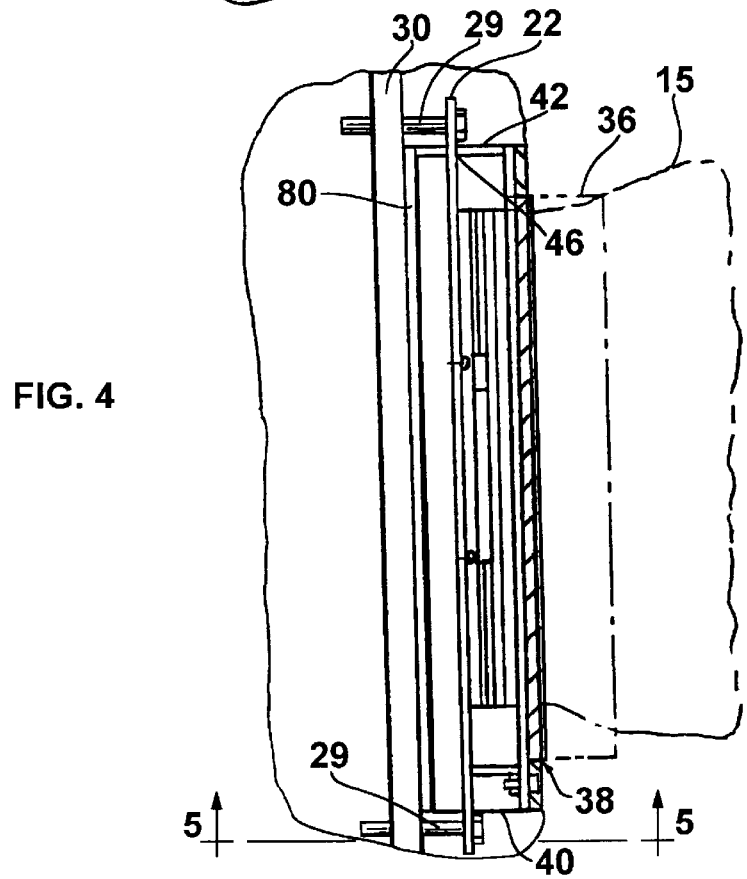
FIG. 4 is a partial cross-sectional view taken on the line 4—4 showing the side airbag system with the airbag module affixed to the rigid frame member of the seat back.

The cover member 10 is in the form or shape of a pyramidal frustrum or, more simply, comprises an open-ended tapered box 34 (somewhat resembling a plastic waste basket). The cover member 10 is completely open at one end 40 FIG. 4 while being closed at the opposite end by wall 42. The cover member 10 is capable of opening at its top portion (as seen in FIG. 1) when a riser, serving as a decorative cover 36, which is formed integrally as part of the cover member, swings open. Thus, the decorative cover 36 acts as a door which opens responsive to inflation and consequent movement of the airbag 15. As seen in FIG. 4, the decorative cover 36 is adapted to project slightly from an opening 38 created in the side panel 39 of the vehicle seat back 32.

The cover member 10 is preferably constituted of a thermoplastic elastomeric material such as polystyrene. Injection molding is one technique typically used for fabrication of the cover member 10, although other techniques could be employed. By such injection molding technique the entire frustrum or box 34, as seen, is produced, as well as the riser portion or decorative cover 36. As already indicated the decorative cover breaks away or opens like a door when the airbag is to be released. This is a consequence of the fact that the decorative cover 36 is joined to the top portion of the box 34 of the cover member in the molding process very weakly; that is, the molding is accomplished such that a frangible line is created where the decorative cover 36 meets the box 34 of the cover member 10.

It will be noted that the near end of the top portion of the cover member 10 is provided with a plurality of holes 50 so that the top portion of the cover member 10 may be fastened to the mounting bracket 12 by means of bolts or rivets (not seen) which are run through the holes 50 and through holes 60 in the fastening means 26 attached to the main plate 22.

It is desirable to affix a trim flange 70 to cover any peripheral ragged edge of cover material present at the opening 38, in the side panel of the seat back 32. This trim flange 70 is provided with three openings 72 which correspond with the openings 50 in cover member 10 so that the trim flange may likewise be affixed or fastened to the fastening device 26.

It will be seen that a slot 46 is provided at the far end of end wall 44 as seen in FIG. 4. As a result the mounting bracket flat plate 22 can be inserted into the slot 46 so that it extends beyond the end wall 42.

It will thus be appreciated that by having this feature of the flat main plate 22 of the mounting bracket inserted into the slot 46 and extended beyond, makes extremely simple the location of the cover member and modular assembly with respect to the mounting hardware so as to achieve the desired fit to the seat by way of the rigid seat frame member 30. It will further be appreciated by reference to FIG. 4 that the entire assembly described, that is the side airbag module 1 is so mounted in the seat back 32 that the inner side or wall 80 of the cover member 10 is securely clamped between the mounting plate 22 and the rigid seat frame member 30.

It will now be fully understood that due to the unique arrangement for the mounting bracket within the cover member, combined with the fact that the airbag and inflator assembly is securely mounted on the mounting bracket, there is no need for typical cover retaining devices such as locking grooves, retainers and the like. Moreover, the pyramidal frustrum design for the cover member and its fabrication by means of strong plastic material ensures a fixed clearly defined pathway for travel of the airbag 15 when inflated, thus assuring consistent deployment of the airbag at the precise desired location on the seat back.

The invention having been thus described with particular reference to the preferred forms thereof, it will be obvious that various changes and modifications may be made therein without departing from the spirit and scope of the invention as defined in the appended claims.

What is claimed is:

1. A side impact airbag deployment system comprising:

a vehicle seat having a seat bottom portion and a seat back portion, and a rigid seat frame member internally disposed within the seat back portion;

an airbag module secured to the rigid frame member and oriented for deployment of the airbag through the seat back portion;

the airbag module comprising an airbag and inflator assembly; a cover member for containing an airbag and inflator assembly and for providing a defined pathway for deployment of said airbag when inflated; and opening on the seat back portion forming part of the defined pathway; a mounting bracket including a main plate portion having opposite first and second ends, and a fastening device at the first end for fastening the upper portion of said cover member to the main plate portion, further including a side plate portion, connected to said main plate portion, to which said airbag and inflator assembly is fastened.

2. A system as defined claim 1, in which said cover member is integrally formed by injection molding of thermoplastic material.

3. A system as defined in claim 2, in which the thermoplastic material is polystyrene.

4. A system as defined in claim 1, in which said cover member is open at one end and closed at its opposite end; and a slot is provided at the opposite end for receiving the second end of the main plate portion of the mounting bracket.

5. A system as defined in claim 1, in which the decorative cover is joined to the main portion of the cover member by a tear seam for permitting deployment of the airbag outside the seat back portion, the decorative cover thereby serving as a door.

6. A deployment system as defined in claim 1, further including a trim flange, and wherein said mounting bracket includes a fastening device at its first end for fastening one end of the cover member and the trim flange thereto.

7. A side impact airbag module for use in a vehicle seat having a seat bottom portion and a seat back portion, and a rigid seat frame member internally disposed within the seat back portion comprising:

an airbag module secured to the rigid seat frame member and oriented for deployment of the airbag through the seat back portion;

the airbag module comprising an airbag and inflator assembly; a cover member for containing an airbag and inflator assembly and for providing a defined pathway for deployment of said airbag when inflated; and opening on the seat back portion forming part of the defined pathway; a mounting bracket including a main plate portion having opposite first and second ends, and a fastening device at the first end for fastening the upper portion of said cover member to the main plate portion; and further including a side plate portion, connected to said main plate portion, to which said airbag and inflator assembly is fastened.

8. A side impact airbag module as defined claim 7, in which said cover member is integrally formed by injection molding of thermoplastic material.

9. A side impact airbag module as defined in claim 8, in which the thermoplastic material is polystyrene.

10. A side impact airbag module as defined in claim 7, in which said cover member is open at one end and closed at its opposite end; and a slot is provided at the opposite end for receiving the second end of the main plate portion of the mounting bracket.

11. A side impact airbag module as defined in claim 7, in which the decorative cover is joined to the main portion of the cover member by a tear seam for permitting deployment of the airbag outside the seat back portion, the decorative cover thereby serving as a door.

12. A side impact airbag module as defined in claim 7, further including a trim flange, and wherein said mounting bracket includes a fastening device at its first end for fastening one end of the cover member and the trim flange thereto.

* * * * *